United States Patent

Bourekas et al.

[19]

[11] Patent Number: 6,128,703
[45] Date of Patent: Oct. 3, 2000

[54] METHOD AND APPARATUS FOR MEMORY PREFETCH OPERATION OF VOLATILE NON-COHERENT DATA

[75] Inventors: Philip Bourekas; Tuan Anh Luong, both of San Jose; Michael Miller, Saratoga, all of Calif.

[73] Assignee: Integrated Device Technology, Inc., Santa Clara, Calif.

[21] Appl. No.: 08/924,113

[22] Filed: Sep. 5, 1997

[51] Int. Cl.[7] .................................................. G06F 12/08
[52] U.S. Cl. .......................... 711/138; 711/118; 711/137; 711/143; 712/207
[58] Field of Search ..................................... 711/138, 118, 711/143, 144, 145, 146, 122, 125, 126, 137; 712/207

[56] References Cited

U.S. PATENT DOCUMENTS 5,247,639  9/1993  Yamahata .................................. 711/138
5,454,093  9/1995  Abdulhafiz et al. ..................... 711/133
5,748,938  5/1998  Kahle ...................................... 711/138

*Primary Examiner*—Hiep T Nguyen
*Attorney, Agent, or Firm*—James W. Huffman

[57] ABSTRACT

An apparatus and method for prefetching data into a cache memory system is provided. A prefetch instruction includes a hint type that allows a programmer to designate whether, during a data retrieval operation, a hit in the cache is to be ignored or accepted. If accepted, the prefetch operation completes. If ignored, the prefetch operation retrieves data from the main memory, even though the cache believes it contains valid data at the requested memory location. Use of this invention in a multiple bus master processing environment provides the advantages of using a cache memory, i.e., burst reads and a relatively large storage space as compared to a register file, without incurring disadvantages associated with maintaining data coherency between the cache and main memory systems.

43 Claims, 6 Drawing Sheets

METHOD AND APPARATUS FOR MEMORY PREFETCH OPERATION OF VOLATILE NON-COHERENT DATA

BACKGROUND OF THE INVENTION

1. Field of the Invention

This invention relates in general to the field of memory coherency, and more particularly to a method and apparatus for managing the coherency of volatile data in a cache memory.

2. Description of the Related Art

The invention described in the Detailed Description below is directed at solving data coherency problems when managing volatile data in multiple bus master environments. However, before these problems are addressed, a brief overview of computer memory hierarchies is given. After the overview, a general explanation of the problems associated with utilizing multiple memory hierarchies, e.g., maintaining coherency, snooping and prefetching, is provided.

In modern computing systems, a number of distinct levels of memory hierarchy have been established. This is particularly illustrated with reference to FIG. 1 where a register file is shown at the top of a pyramid 100, as the smallest but fastest memory, with secondary memory at the bottom, as the slowest and least expensive memory, but having the greatest storage capacity. Each of these levels provide storage for instructions or data, as needed by a processor. However, they typically differ from each other in terms of performance, size and cost. Lower cost memory provides greater storage for a given budget, but such memory often requires the processor to halt, or delay processing, until data is read from or written to the memory. Higher cost memory responds to access requests by a processor faster than lower cost memory, but typically stores much less information. Thus, when designing a computing system, it is typical to utilize a mixture of different memory hierarchies to obtain an optimum solution.

A solution chosen by many computing system designers is implemented by populating main memory with relatively slow access, inexpensive memory, such as DRAM, while also incorporating a relatively small amount of high cost, fast access primary and/or secondary cache memory, such as SRAM.

Referring now to FIG. 2, a computer system 200 is shown illustrating five notable levels of memory hierarchy, labeled Levels 0–4. The computer system 200 contains a microprocessor 202 coupled to a number of different memories 210, 212 and 214. Within the microprocessor 202 is a CPU 204, containing a register file 206, and a primary cache 208.

The register file 206 is considered the memory closest to the CPU 204 and the easiest to access by the CPU 204. It is regarded as level 0 in the overall memory hierarchy and is a part of the CPU 204. The register file 206 is typically the smallest memory within the hierarchy, but also provides the fastest response to CPU operations.

The CPU 204 is connected to the primary cache 208 (Level 1). The primary cache 208 provides the fastest access of any memory level outside of the CPU 204. In many modern microprocessors the primary cache 208 is on the same chip with the CPU 204.

Outside of the microprocessor 202 is a secondary cache 210 (Level 2). The secondary cache 210 is typically much larger than the primary cache 208, but does not provide the same access performance as the primary cache 208. In fact, in many computer systems, access to information in the secondary cache 110 requires the microprocessor 202 to delay processing until the data is written to, or retrieved from the secondary cache 210.

Level 3 in the memory hierarchy is the main memory 212. The main memory is the one actually addressed by the CPU 204. It typically contains the code and data for currently running programs. However, it is in general of insufficient size to contain all information that may be required by users. That is why another level of memory is often needed.

Level 4 in the memory hierarchy is the secondary memory 214. The secondary memory 214 is used as the repository storage of information, and is typically associated with magnetic discs, optical discs, networks, or tapes.

When designing a computer system that includes a number of different memory hierarchies, such as those discussed above, two particular problems are of concern to a designer. The first problem deals with how to anticipate what data the processor will require in subsequent instruction cycles, and what steps are necessary to optimize the chance that data is present in the on-chip primary cache when needed. The second problem concerns establishing a coherency mechanism that assures that the data which is required, is the latest "valid" data, if located in the on-chip primary cache, or the secondary cache.

A number of solutions have been proposed to deal with both of the above-described problems. For anticipation, many cache systems automatically perform a "burst" read anytime a piece of data is requested, and that data is not already present in the cache. A burst read is a bus operation that transfers multiple bytes of data into a cache in one operation, in less time than multiple individual read requests. More specifically, when retrieving data from a main memory or secondary cache, a number of bus cycles are typically required to specify the address of the data to be retrieved, and to set up the secondary cache or main memory to deliver the data. This overhead is typically required for every read operation. After the overhead, the secondary cache or main memory delivers the data. Since the overhead time is costly for each data retrieval operation, burst reads are used. A burst read can be characterized as a single read transaction that causes multiple back to back data transfers to occur.

A burst read is based on the principal of spatial locality which states that programs and the data they request tend to reside in consecutive memory locations. This means that programs are likely to need code or data that are close to or adjacent to locations already in use. So, if a processor attempts to read data, and the data is not present in the primary cache, the primary cache causes a burst read operation. The burst read retrieves the requested data into the cache, along with adjacent bytes of data, for example. Thus, in subsequent operations, if accesses are made to data locations adjacent to the original request, they may be provided directly by the primary cache, without having to incur the overhead associated with individual read requests.

A second improvement in anticipation is the MOVE MULTIPLE processor instruction. This instruction has benefits similar to the burst read, and directs the processor to retrieve desired data and place the data within the processor'register file. Unfortunately, for most processors, use of such an instruction ties up valuable register space that cannot be allocated to data storage.

Another improvement in anticipation is the PREFETCH, or TOUCH, processor instruction. This instruction allows a programmer to direct the cache to retrieve a particular stream of data before it is needed by the processor. The instruction may be used at the beginning of a program loop, for example, to retrieve data that will be required during execution of the next loop iteration. If the data is not already in the cache, the cache system retrieves the specified data, and places it into the on-chip cache, while the processor is executing the first pass of the loop. Then, when the rest of the data in the stream is needed, it is already available in the cache. This instruction relies on the spatial locality principle, discussed above, and is typically performed using burst read operations.

To deal with the problem of coherency, a number of hardware, software and hardware/software methodologies have been used. In systems where multiple devices can modify the contents of main memory, such as a processor and a direct-memory-access (DMA) controller, a methodology is necessary to assure that changes to the main memory will either be noticed by the cache, or to assure that data requests to the cache will obtain the latest data within the main memory.

In some processors, "snoop" hardware is provided within the cache system to monitor the memory bus and flag or invalidate cache contents any time a write is performed to an area of main memory that contains data at the same memory location as data contained in the cache. However, snoop hardware is costly to implement, dictates particular and often complex system interfaces, and thus is not desirable in all processors.

Another method that deals with coherency treats as non-cacheable all data that may be changed in main memory by devices other than the processor. This method prevents the processor from retrieving "old" or "stale" data from the cache when newer data may reside in main memory. However, as should be apparent, it forces the processor to utilize slower main memory for all data accesses within the non-cacheable area. The speed advantages of a cache for such data are thereby rendered moot. In addition, advantages obtained through burst operations are also lost.

A software method that deals with coherency utilizes a specific software instruction to flush particular contents of the cache immediately before requesting data from an area which the programmer believes has been modified by another master device. This causes the processor to invalidate the cache contents and deliver any modified data to the main memory. Then, the more recent data is requested from the main memory to update the cache. Once the cache has been updated, the processor utilizes the cache for data processing. However, to perform the flush operation, data in the cache that has not yet been written back into main memory must first be written to main memory, then the requested data is retrieved. During this operation, the processor is halted, delaying it from dealing with its present task. It should be appreciated that, similar to the burst read operation discussed above, significant overhead is required to first flush the cache, then perform a burst read operation into the cache. Moreover, additional processor time is required to execute the flush instruction and cause the burst read operation.

In the first method, the programmer foregoes the advantages of using a high speed cache for those areas of memory that may be modified by devices other than the processor. In the second method, any delays associated with flushing the cache are incurred, prior to retrieving the desired data. When using the above-mentioned PREFETCH instruction within a multiple bus master system, it is common practice to explicitly flush the desired cache line prior to performing the prefetch. This insures that the program will take advantage of the latest data, and still provides the benefits of using a cache memory system. However, flushing the cache prior to performing the prefetch is time consuming, complicates the software, and adds additional processing delays.

With the above understanding of memory hierarchies, and the associated problems in using multiple memory hierarchies within a computing system, a brief example is provided that illustrates how these problems effect performance in a computing system. Referring to FIG. 3, a block diagram is shown which illustrates a multiple-bus-master computer system 300. Within the system 300 is a processor 302 connected to a main memory system 306 via a host bus 308. Inside the processor 302 is a primary cache 304. Also connected to the main memory 306 are a plurality of bus master devices 310, 312 and 314. For purposes of illustration, it is presumed that the processor 302 and all of the bus master devices 310–314 can modify data within the main system memory 306.

Now, if it is assumed that the processor 302 requires data at physical addresses B000FFF0h–B000FFFFh, it will attempt to retrieve the data from the primary cache 304. If the data is not stored within the cache 304, then the processor 302 will request access to the bus 308, and will initiate a burst read from the main system memory 306. The main system memory 306 will provide the data to the processor 302, and the processor 302 will store the data within the primary cache 304. Then the data is available to the processor 302 from the primary cache 304.

But, it may also be assumed that at some later time, one of the other bus master devices 310–314, perhaps a DMA controller associated with an I/O device, may overwrite the data within the main system memory 306 at addresses B000FFF0h–B000FFFFh. For example, data packets may be coming in from a network connection to a specified memory location. At this point, there is a coherency problem between the data in the main memory 306 and the data in the primary cache 304, i.e., the data is not the same between two memory devices, at the same address. Unless software explicitly flushes the data in the primary cache 304, as discussed above, the next time the processor 302 attempts to read data at any of the addresses B000FFF0h–B000FFFFh, the primary cache 304 will provide old data to the processor 302. Unfortunately, the data provided would not be the "latest" data, and erroneous execution would result. To overcome delays associated with having to utilize the main memory 306 to provide coherent data, or with having to flush the cache 304 prior to retrieving data, the present invention is provided, as described below.

What is needed is an apparatus and method that solves the above problems by providing a solution to the issues of coherency in a multi-bus master environment, while still supplying the advantages of prefetching and caching volatile data. More specifically, what is needed is a method and apparatus for prefetching specified data into a cache memory, while insuring that the data that is prefetched is the "latest" valid data.

SUMMARY

To address the above-detailed deficiencies, it is an object of the present invention to provide a micro controller which ignores a "hit" in the on-chip cache when a form of prefetch instruction specifies that data should be retrieved from main memory, since the data is volatile.

It is a further object of the present invention to provide a cache system that does not need to invalidate or flush an area of cache, during a prefetch operation, prior to retrieving the latest data from a main memory.

Accordingly, in the attainment of the aforementioned objects, it is a feature of the present invention to provide a processor, that is connected to a main memory, with the main memory being connected to a plurality of bus master devices that can modify data within the main memory. The processor includes a primary cache and a prefetch instruction with an ignore-hit indicator. The primary cache is connected to the main memory, and retrieves the data within the main memory, and temporarily stores the data. The prefetch instruction is provided to the instruction register by a source, such as an instruction cache. The prefetch instruction directs the primary cache to determine whether specified data is stored within the primary cache, and if the specified data is not stored within the primary cache, the prefetch instruction directs the primary cache to retrieve the specified data from the main memory. Within the prefetch instruction is an ignore hit indicator that provides an indication to the primary cache as to whether the specified data should be retrieved from the main memory, even if the specified data is stored within the primary cache.

An advantage of the present invention is that in multi bus master environments which use microprocessors that do not have hardware snoop circuitry, data transfer advantages associated with cache memory, e.g., burst reads and low latency, can be utilized by a programmer, without requiring the programmer to specify a separate operation to explicitly flush a cache before retrieving the prefetched data.

In another aspect, it is a feature of the present invention to provide a microprocessor based system that processes a first data stream and subsequently a second data stream. The microprocessor based system includes a main memory and a microprocessor. The microprocessor further includes an instruction decoder, a cache memory, and a prefetch instruction with an ignore-hit indicator. The main memory stores the first data stream at a first address, and subsequently the second data stream at the first address. The microprocessor is connected to the main memory, and retrieves the first and second data streams from the main memory, and processes the data streams. Within the microprocessor is an instruction decoder that decodes the processor instructions, and provides control information to the microprocessor. The microprocessor also has a cache memory that is connected to the instruction decoder, and to the main memory, that retrieves the first data stream from the main memory, and subsequently the second data stream from the main memory. And finally, the microprocessor includes a prefetch instruction, which is provided to the instruction decoder from a source, such as an instruction cache. The prefetch instruction includes an ignore-hit indicator, which directs the cache memory to retrieve the second data stream from the main memory, even if the first data stream has already been retrieved into the cache memory.

An advantage of this invention is that even if the second data stream has overwritten the first data stream, at the first address within the main memory, a prefetch instruction which specifies an ignore hit operation can prevent the microprocessor from retrieving stale data from the cache (i.e., the first data stream), even when a "hit" occurs. And, the microprocessor does not need to flush the cache, or invalidate a portion of the cache memory, to insure coherency between the cache memory and the main memory.

In yet another aspect, it is a feature of the present invention to provide a method for prefetching data from a main memory into a cache memory, within a computing system having a plurality of bus master devices, where the bus master devices are capable of modifying the data within the main memory. The method includes the steps of providing a prefetch instruction to one of the bus master devices to retrieve the data from the main memory and to place the data into the cache memory, specifying within the prefetch instruction whether data within the cache memory is to be ignored during the prefetch, if data within the cache memory is to be ignored, prefetching the data from the main memory, even if there is a cache "hit".

In another aspect, it is a feature of the present invention to provide a micro controller, within a multiple bus master system which has a main memory and a direct-memory-access (DMA) controller, where the micro controller has an on-chip cache memory. The micro controller includes an instruction decoder, and a prefetch instruction with an ignore-hit indicator. The instruction decoder decodes instructions stored in the instruction register. And, the prefetch instruction, loads specified data from the main memory into the cache memory. The prefetch instruction further includes an ignore-hit indicator that specifies when a cache "hit" should be ignored during execution of the prefetch instruction.

An advantage of the present invention is that when dealing with data that can be changed by multiple bus master devices, such as direct-memory-access (DMA) controllers, within an environment that does not provide for hardware controlled data coherency, a block of changeable data can be treated as cacheable, without engaging in cumbersome or time consuming software techniques to insure coherency.

BRIEF DESCRIPTION OF THE DRAWINGS

These and other objects, features, and advantages of the present invention will become better understood with regard to the following description, and accompanying drawings where.

DETAILED DESCRIPTION

Figure 1:
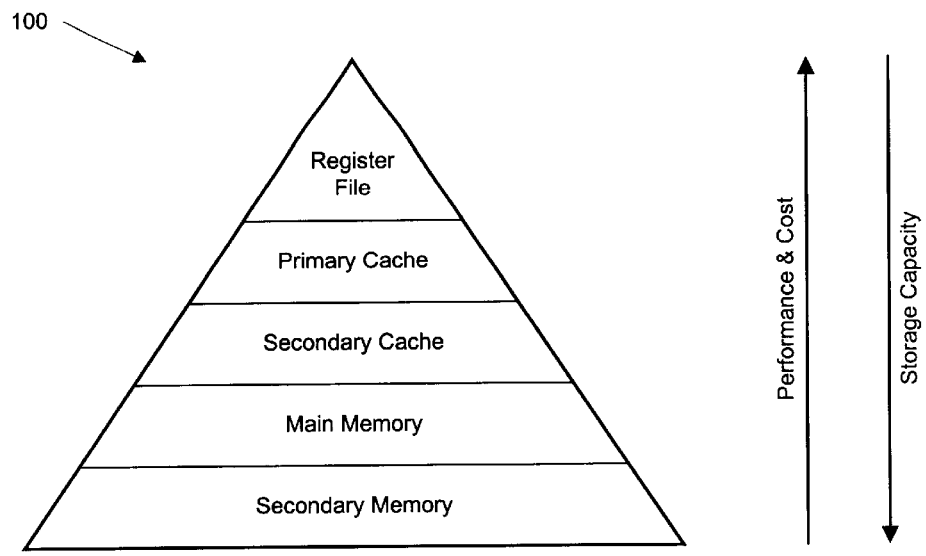
FIG. 1 is a block diagram illustrating memory hierarchy for computer systems.
Figure 2:
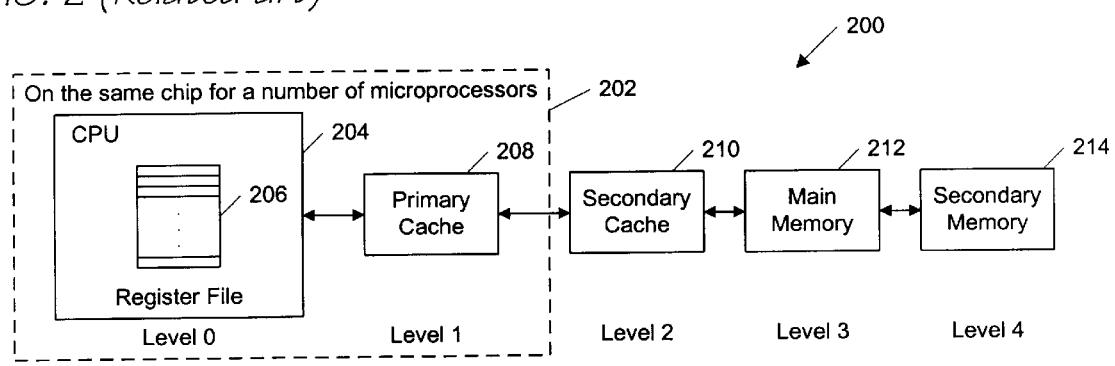
FIG. 2 is a block diagram of a computer system illustrating multiple levels of memory accessed by a CPU.
Figure 3:
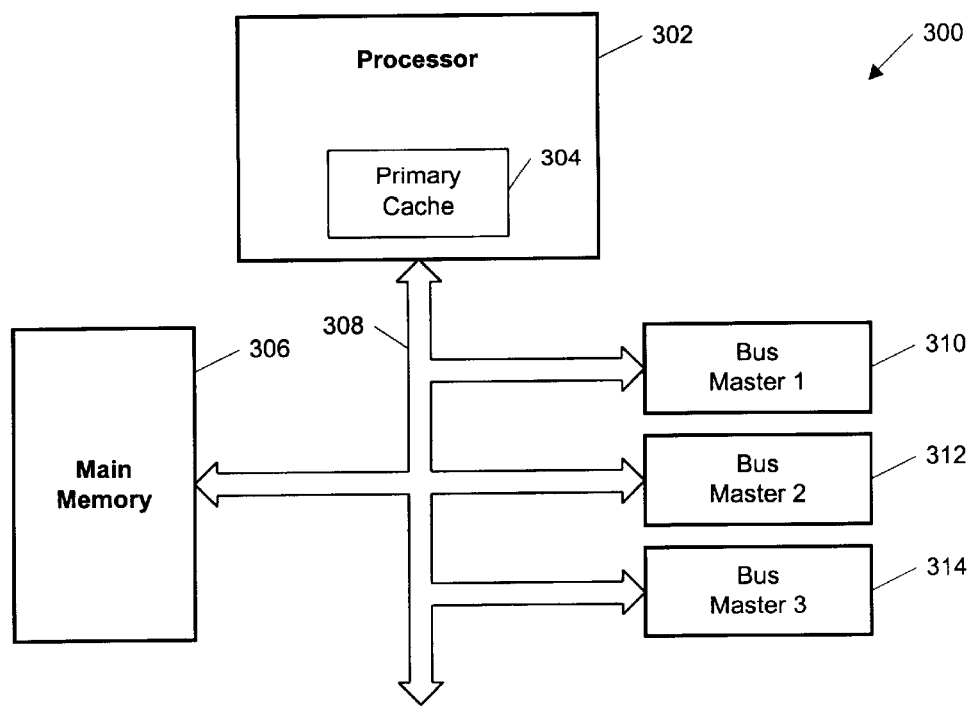
FIG. 3 is a block diagram illustrating a multi-bus-master processor environment.
Figure 4:
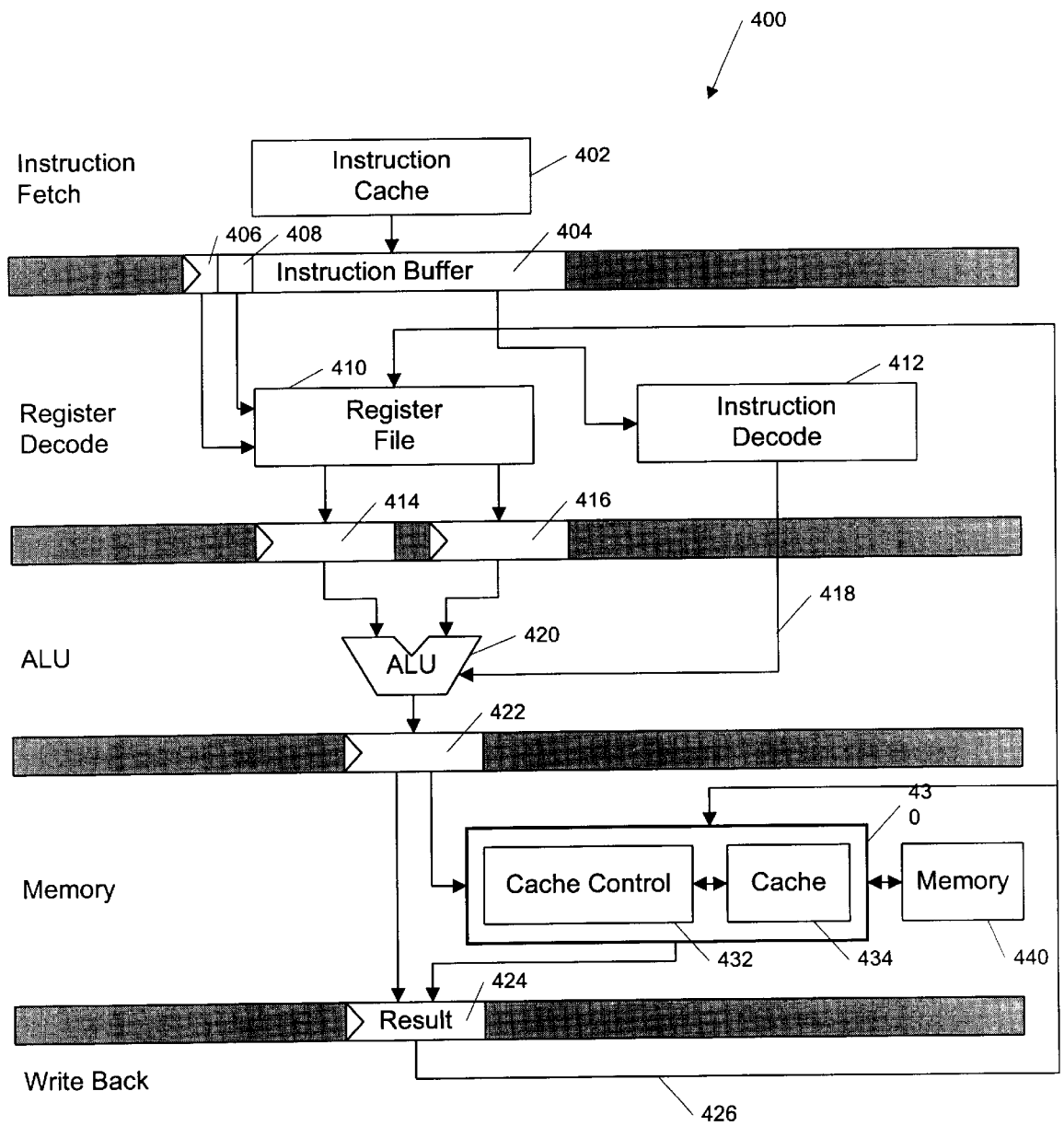
FIG. 4 is a block diagram illustrating a portion of a pipeline processor that could incorporate the present invention.

Referring to FIG. 4, a portion of a pipeline processor 400 is shown to illustrate operation of the present invention. The processor 400 has a five stage pipeline with the stages including: 1) Instruction Fetch; 2) Register/Instruction Decode; 3) ALU; 4) Memory Retrieval; and 5) Write Back.

In the instruction fetch stage, processor instructions are fetched from an instruction cache 402 and provided to an instruction buffer 404. The instruction buffer 404 temporarily holds instructions which will be decoded and executed by subsequent stages in the processor 400. The instruction buffer 404 contains operand locations 406, 408 to store operands associated with the instructions.

During the Register/Decode stage, operands within the operand locations 406, 408 are provided to a register file 410 for retrieval of data from the register file 410. The register file 410 retrieves specified data and provides the data to temporary buffers 414, 416 for use by the following ALU stage. Also during the Register/Decode stage, the processor instruction within the instruction buffer 404 is provided to instruction decode logic 412. The instruction decode logic 412 determines what operations and resources are required to implement the processor instruction in the instruction buffer 404. For ease of illustration, a single control bus 418 is shown proceeding from the instruction decode logic 412, to control various hardware within the processor 400. However, one skilled in the art will appreciate that the instruction decode logic 412, and the control bus 418, as shown in FIG. 4 are illustrative only, and not intended to represent actual electric circuits or signal paths. Rather, they are provided to aid understanding of the present invention that will be further described with reference to FIG. 7.

Continuing with FIG. 4, the ALU stage of the pipeline contains an arithmetic logic unit (ALU) 420 which performs logical and computational operations on data stored within the temporary buffers 414, 416. The result of any ALU operations are placed within a temporary buffer 422 for use by later stages in the pipeline.

During the memory stage, results from [temporary buffer 422] computational or logical operations may be forwarded directly to a result register 424 to be written back to either memory or the register file, as shown by write-back bus 426. However, if a particular instruction requires data to be retrieved from memory, the address of the desired memory location will calculated by the ALU stage and provided to the temporary buffer 422. This address will then be provided to a cache system 430 that has a cache control block 432 and a cache memory 434. If the desired data is stored within the cache memory 434, the data will be provided directly to the result register 424, via cache data bus 436 for use by future instructions. If however the desired data is not stored within the cache memory 434, the address information within the temporary buffer 422 is used to retrieve the data from a main memory 440. In such an instance, the processor 400 halts execution until the data is provided by the main memory 440 and stored into the cache system 430. The retrieved data is then written into the result register 424.

During the write-back stage, the contents of the result register 424 are written into either the cache system 430, or the register file 410, as dictated by the processor instruction. One skilled in the art will appreciate that the above discussed pipeline stages are illustrative only. Other processor architectures may have additional pipeline stages, or may combine the illustrated stages, as needed, to optimize execution speed of a particular instruction set. The above merely provides a concrete background for describing the present invention.

Figure 5:
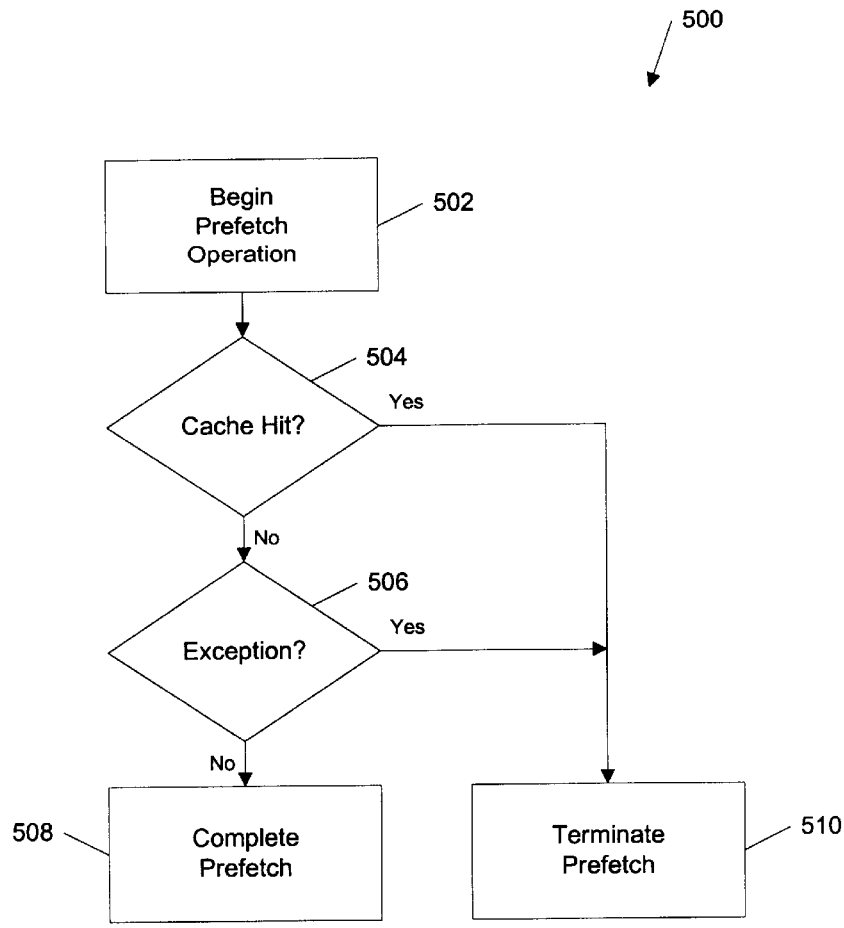
FIG. 5 is a flow chart illustrating a prefetch operation according to the prior art.

Now referring to FIGS. 4 and 5 a flow chart 500 is shown which illustrates the operation of the cache system 430 within the processor 400 when a standard PREFETCH instruction is executed. A PREFETCH instruction is used by a programmer to retrieve data from the memory 440, and place the data within the cache system 430 so that future processor instructions that require access to the data will not have to wait on the memory 440 to provide the data.

At step 502, the PREFETCH instruction is provided by the instruction cache 402 to the instruction buffer 404. The PREFETCH instruction is decoded by the instruction decode logic 412, and any operands associated with the address of the data to be retrieved are provided by the register file 410. The address of the data is calculated by the ALU 420 and provided to the temporary buffer 422.

At decision block 504, the address within the temporary buffer 422 is provided to the cache system 430. If the cache control 432 determines that the desired data is within the cache memory 434, then a cache "hit" has occurred. Instruction flow proceeds to block 510 where the PREFETCH terminates execution, because it has insured that the desired data is already within the cache. If the cache control 432 determines that the desired data is not within the cache memory 434, then instruction flow proceeds to decision block 506.

At decision block 506, an exception is taken to determine if any parity errors or bus errors exist. If errors exist, then instruction flow proceeds to block 510 where the PREFETCH terminates execution. Otherwise, instruction flow proceeds to block 508 where the data is requested from the main memory 440. The data is retrieved from the main memory 440 and provided to the cache memory 434 for use by later processor instructions.

If the PREFETCH instruction, as described above, is used in a single bus master environment, where data in the main memory 440 cannot be changed by any device other than the processor 400, then the cache control 432 can be assured that it will provide the latest data to the processor 400. However, if the main memory 440 can be modified by another bus master device, outside of the processor 400, then a "hit" by the cache control 432 could cause the cache system 430 to provide stale data to the processor 400. In such a situation, it is common for a programmer to require the cache memory 434 to flush the cache line associated with the address containing the desired data, or the cache control 432 to invalidate data at the desired address, prior to execution of the PREFETCH instruction. Explicitly flushing the contents of the cache memory 434 and invalidating the cache contents at the desired memory location requires costly processor time.

Figure 6:
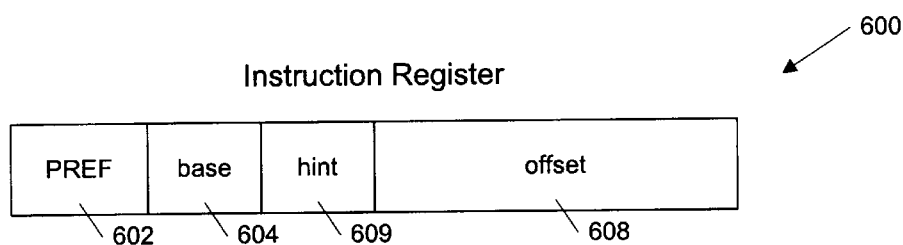
FIG. 6 is a block diagram illustrating bit portions of a prefetch instruction according to the present invention.

Now referring to FIG. 6, a format for a PREFETCH instruction 600, according to the present invention is provided. The PREFETCH instruction 600 includes an opcode PREF 602 to indicate to the instruction decode block 412 that a prefetch operation is required, a base address operand 604 which references a base address for a desired memory location, and an offset operand 608 which is used with the base address to calculate the effective address for the first byte of data to be retrieved by the PREF instruction. For a cached memory location, the expected action is for the processor 400 to prefetch a block of data that includes the effective address. The size of the block, and the level of the memory hierarchy it is fetched into are implementation specific.

Also provided within the PREF instruction 600 is a hint field 609. The hint field 609 supplies information about the way the data is to be used. For example, the hint field 609 may indicate that the data is to be loaded, and reused extensively, i.e., it should be "retained" in the cache. Or, it may indicate that the data is to be loaded, but will not be used extensively. The prefetch should therefore not displace data that is to be retained.

In addition, the hint field 609 provides an indicator that a "hit" in the cache should be ignored. Use of the ignore-hit indicator allows a programmer to direct the cache system 430 to retrieve data from the main memory 440, even if data at the same address is presently available in the cache memory 434. This is especially useful in a multiple-bus-master environment when the programmer anticipates that data in the main memory 440 may have been modified by a device external to the processor 400, such as a DMA controller, and the cache control 432 is not aware of the modification. If the programmer sets the hint field 609 to indicate that a prefetch should ignore a hit in the cache, the cache control 432 will retrieve the desired data from the main memory 440. Furthermore, by directing the cache control 432 to retrieve data from the main memory, even when there is a cache "hit", the processor 400 has not had to flush the cache, or invalidate cache data at the desired memory address prior to executing the PREFETCH instruction.

One embodiment of the PREF instruction has the following format:

PREF hint,offset(base)

where the hint field 609 can assume one of a plurality of values, as needed, including an ignore-hit indicator to specify whether the cache system 430 should retrieve the prefetched data even if there is a cache hit.

Figure 7:
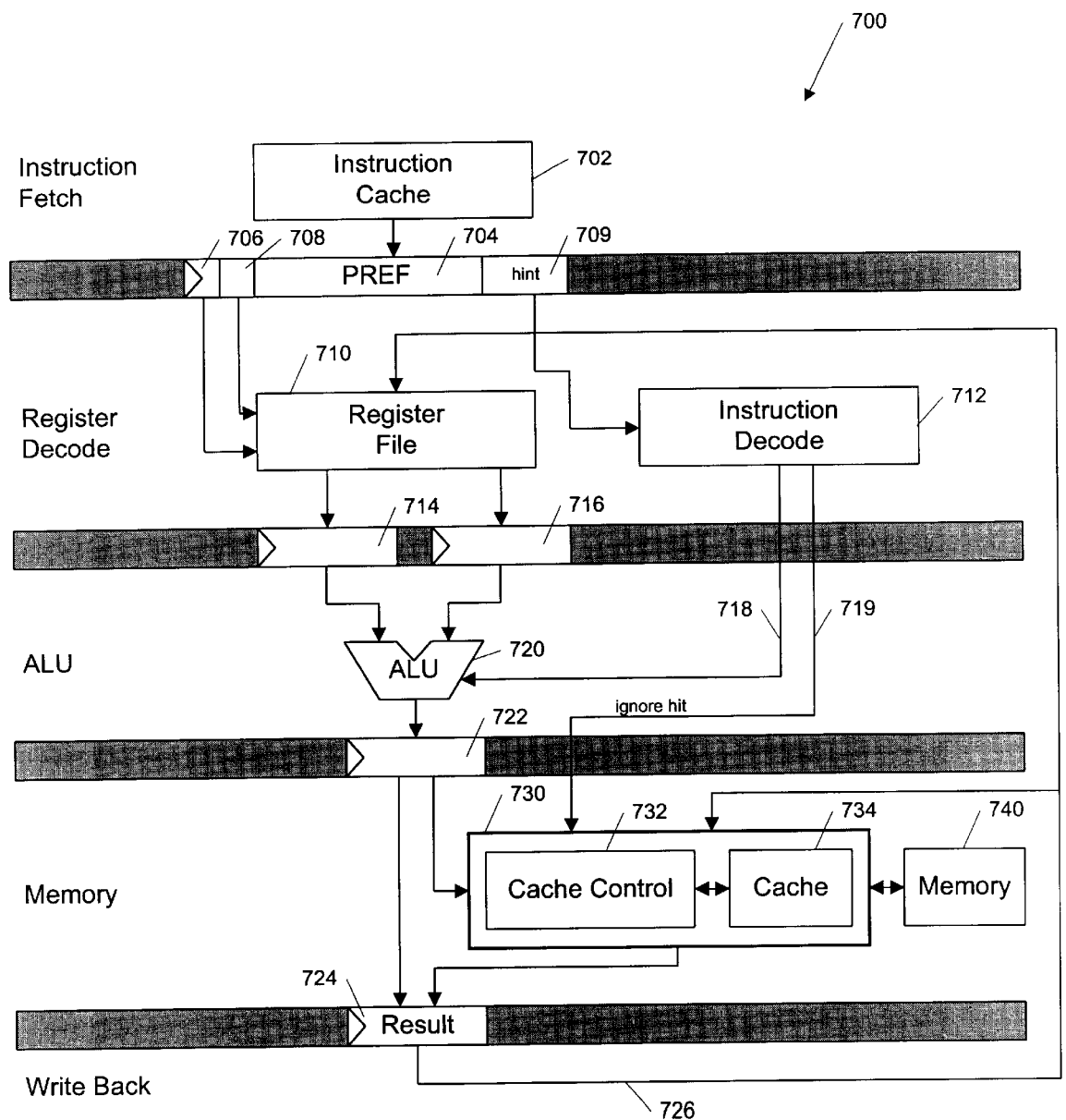
FIG. 7 is a block diagram illustrating a portion of a pipeline processor incorporating the present invention.

Operation of the PREF instruction 600 is now shown with reference to FIG. 7. FIG. 7 contains a pipeline processor 700, similar to that described in FIG. 4. Like elements have been referenced with like designators except that the hundreds digit has been replaced by a 7 instead of a 4. In addition to the elements described in FIG. 4, the processor 700 shows a PREF instruction within the instruction buffer 704. The PREF instruction has been retrieved from the instruction cache 702 and has been placed within the instruction buffer 704 for execution by the processor 700.

Particularly shown is a hint field 709 within the PREF instruction. The PREF instruction is provided, along with the hint field 709, to the instruction decode logic 712. In addition to decoding the PREF instruction, the instruction decode logic 712 decodes the hint field 709 to determine whether the cache control 732 is to ignore a cache hit when performing the prefetch. If so, the instruction decode logic 712 provides an ignore-hit signal 719 to the cache system 730. Otherwise, the prefetch operation will execute similar to that discussed above with reference to FIG. 5.

Figure 8:
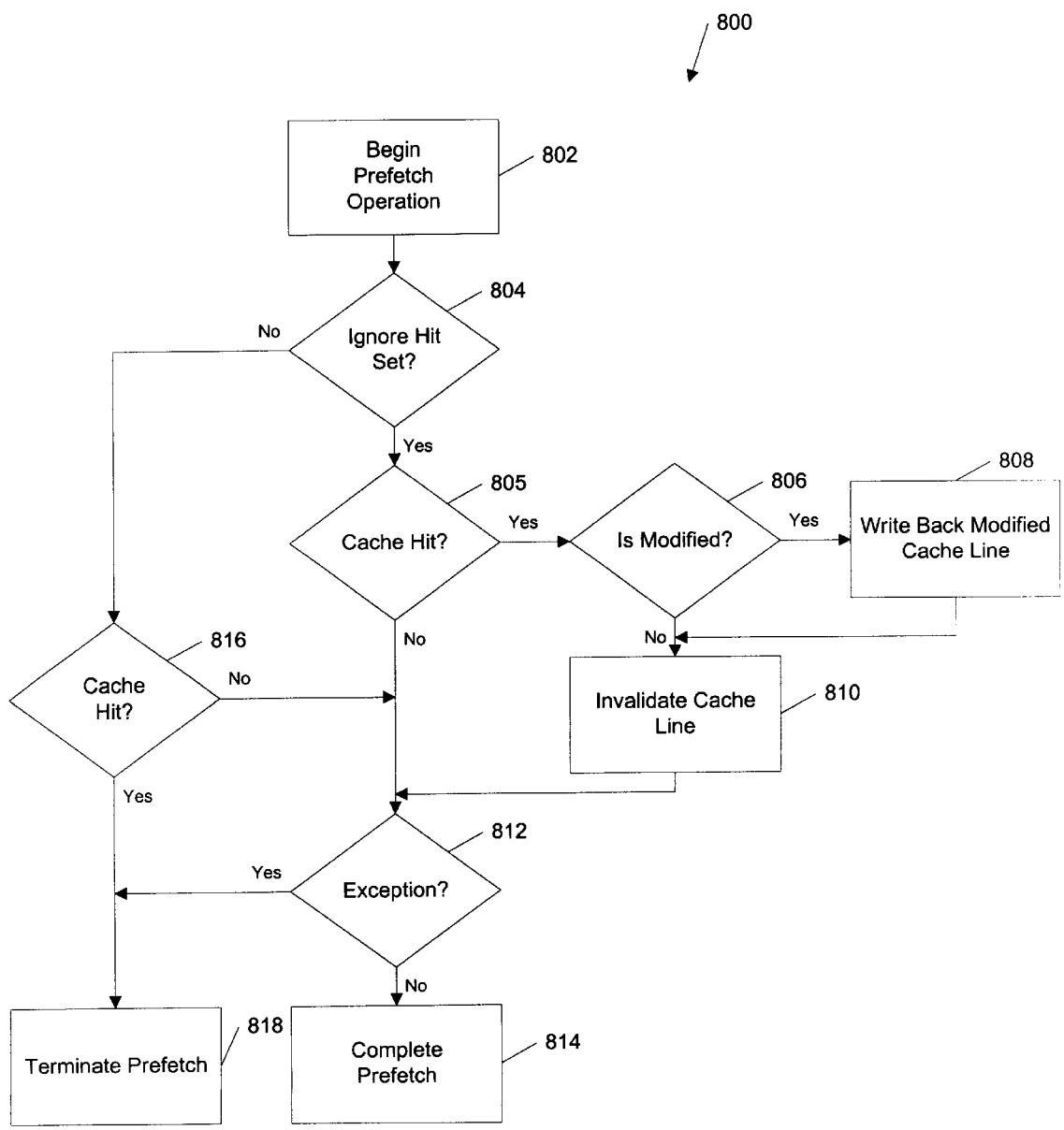
FIG. 8 is a flow chart illustrating the prefetch operation according to the present invention.

Now referring to FIG. 8, a flow chart 800 is shown which illustrates operation of the PREF instruction of the present invention. The prefetch operation begins in block 802 when the PREF instruction is fetched from the instruction cache 702 and placed within the instruction buffer 704. The PREF instruction is decoded by the instruction decode logic 712, and the address for the prefetch is calculated from the base address retrieved from the register file 710) and from the offset. The effective address is placed within the temporary buffer 722 for use by the cache system.

At decision block 804, a determination is made as to whether the hint field 709 indicates that a "hit" in the cache 734 is to be ignored. If it is determined that a cache hit is not to be ignored, instruction flow proceeds to decision block 816.

If a cache hit is not to be ignored, at decision block 816, the address for the data being prefetched is compared to the contents of the cache 730 to determine whether the prefetch cache line is within the cache memory 734. If it is, then instruction flow proceeds to block 818 where the PREF instruction terminates execution. If there is no cache hit, instruction flow proceeds to decision block 812.

At decision block 812, a determination is made as to whether any exceptions occur (e.g., parity or bus errors) when performing the data retrieval from the memory 740. If so, then instruction flow proceeds to block 818 where the PREF instruction terminates execution. If not, instruction flow proceeds to block 814 where the desired data is transferred from the memory 740 to the cache 734. Operation of the PREF instruction is now complete.

If a hit is to be ignored, instruction flow proceeds to decision block 805. At decision block 805 the processor 700 determines if a copy of the data being prefetched currently resides within the cache 734. If it does, then instruction flow proceeds to decision block 806. If a copy of the data being prefetched does not reside within the cache 734, instruction flow proceeds to decision block 812.

At decision block 806, a test is performed to determine whether the data residing within the cache 734, at the prefetch address, is in a modified state. If not, the cache line is simply invalidated, at block 810, and instruction flow proceeds to decision block 812. However, if the data in the cache is in the modified state, the cache line is first written back to the memory 740, at block 808, the cache line is invalidated, at block 810, and instruction flow proceeds to decision block 812.

At decision block 812, operation continues as discussed above, to either complete the PREF instruction, at block 814, or terminate the PREF instruction, at block 818, depending on whether the prefetch creates an error condition.

In summary, the instruction flow illustrated by FIG. 8 shows that when the ignore hit indicator is not set, prefetch operations occur as normal, either by retrieving the data from memory, when there is no cache "hit", or by terminating the prefetch operation when there is a cache hit or error. However, when the ignore hit indicator is set, a hit in the cache is disregarded, and the data is retrieved from the memory.

Thus, by providing a hint field 709 within a prefetch instruction, that allows a programmer to direct the processor to ignore a hit in the cache during a prefetch operation, burst data reads can be performed into a cache, without first executing software to explicitly flush the cache. In multiple-bus-master environments, where data within the main memory is volatile, and where on-chip cache systems do not provide snoop control to insure cache coherency, the present invention allows the advantages of using a cache memory, e.g., burst data transfers and significant data storage, without incurring the disadvantages cited earlier of providing for cache coherency.

Although the present invention has been described in considerable detail with reference to certain preferred versions thereof, other versions are possible. For example, the instruction described in FIG. 6 has the mnemonic of PREF to indicate that a prefetch operation is to occur. It is possible that the hint field described in FIG. 6 may be applicable to other processor instructions that require the latest data from memory, and do not wish to utilize old cache contents to provide the data. Furthermore, the block diagram in FIG. 7 shows the ignore-hit indicator 719 provided by the instruction decode logic 712 to the cache system 730. One skilled in the art should readily appreciate that other mechanisms may be used to extract an ignore-hit directive from a processor instruction or control word, to control whether or not data contents within a cache may be used. Also, the ignore-hit indicator of the present invention has been illustrated to control an on-chip cache memory system. It is possible that this signal could be used to control a lower level cache, internal or external to the processor, or an external cache for those processors not having an on-chip cache. What should be appreciated is that a method and apparatus has been provided which allows an instruction to specify, at run-time, whether data contents within a cache memory are to be used or ignored during a data retrieval operation. And, if the cache contents are to be ignored, no additional overhead is incurred to provide for cache coherency.

Those skilled in the art should appreciate that they can readily use the disclosed conception and specific embodiments as a basis for designing or modifying other structures for carrying out the same purposes of the present invention. In addition, it should be understood that various changes, substitutions and alterations can be made herein without departing from the spirit and scope of the invention as defined by the appended claims.

We claim:

1. A processor, coupled to a main memory, the main memory coupled to a plurality of bus master devices which modify data within the main memory, the processor comprising:

a primary cache, coupled to the main memory, said primary cache for retrieving the data within the main memory;

wherein said primary cache is accessed with a prefetch instruction, said prefetch instruction comprising:

an ignore hit indicator for indicating to said primary cache whether said specified data should be retrieved from the main memory, even if said specified data is stored within said primary cache.

2. The processor, as recited in claim 1, wherein the processor is a pipelined microprocessor.

3. The processor, as recited in claim 1, wherein the main memory is coupled to the processor via a memory bus.

4. The processor, as recited in claim 1, wherein the plurality of bus master devices comprise:

the processor; and a direct-memory-access (DMA) controller.

5. The processor, as recited in claim 1, wherein the processor further comprises an instruction cache, coupled to the main memory, for temporarily storing said instructions to be executed within the processor.

6. The processor, as recited in claim 5, wherein said prefetch instruction is provided by said instruction cache.

7. The processor, as recited in claim 1, wherein said primary cache further comprises:

a cache controller, for determining whether said specified data is stored within said primary cache; and cache memory, coupled to said cache controller, for storing said specified data retrieved from the main memory.

8. The processor, as recited in claim 7, wherein said cache controller retrieves said specified data from the main memory if said specified data is not stored within said cache memory, when said ignore hit indicator is not set.

9. The processor, as recited in claim 7, wherein said cache controller does not retrieve said specified data from the main memory, if said specified data is stored within said cache memory, when said ignore hit indicator is not set.

10. The processor, as recited in claim 1, wherein said cache controller retrieves said specified data from the main memory, even if said specified data is stored within said cache memory, if said ignore hit indicator indicates that said specified data should be retrieved from the main memory.

11. The processor, as recited in claim 1, wherein said prefetch instruction further comprises a hint field, said hint field for supplying information to said primary cache about how said specified data is to be used by the processor.

12. The processor, as recited in claim 11, wherein said ignore hit indicator is associated with said hint field.

13. The processor, as recited in claim 1, wherein said specified data is data which is specified by providing a memory address.

14. The processor, as recited in claim 13, wherein said memory address is provided within said prefetch instruction.

15. The processor, as recited in claim 1, wherein the processor further comprises instruction decode logic, for decoding said prefetch instruction, including said ignore hit indicator.

16. The processor, as recited in claim 15, wherein said instruction decode logic provides an ignore hit signal to said primary cache when said ignore hit indicator indicates that said specified data should be retrieved from the main memory, even if said specified data is stored within said primary cache.

17. The processor, as recited in claim 1, wherein said ignore hit indicator comprises a bit field within said prefetch instruction.

18. The processor, as recited in claim 17, wherein said bit field is set when said specified data should be retrieved from the main memory.

19. A microprocessor based system, for processing a first data stream and subsequently a second data stream, the microprocessor based system comprising:

a main memory, for storing said first data stream at a first address, and subsequently said second data stream at said first address;

a microprocessor, coupled to said main memory, for retrieving said first and second data streams from said main memory, and for processing said data streams, said microprocessor comprising:

an instruction decoder, for decoding processor instructions, and for providing control information to said microprocessor;

cache memory, coupled to said instruction decoder, and to said main memory, for retrieving said first data stream from said main memory, and subsequently said second data stream from said main memory; and wherein said cache memory is accessed with a prefetch instruction, said prefetch instruction including an ignore-hit indicator, for directing said cache memory to retrieve said second data stream from said main memory, even if said first data stream has already been stored into said cache memory.

20. The microprocessor based system, as recited in claim 19, wherein said microprocessor based system further comprises a plurality of bus master devices.

21. The microprocessor based system, as recited in claim 20, wherein each of said plurality of bus master devices can modify data within said main memory.

22. The microprocessor based system, as recited in claim 20, wherein one of said plurality of bus master devices overwrites said first data stream within said main memory with said second data stream.

23. The microprocessor based system, as recited in claim 19, wherein both said first and second data streams are stored in said main memory at said first address, at different times.

24. The microprocessor based system, as recited in claim 19, wherein said instruction decoder decodes said prefetch instruction to determine whether said ignore-hit indicator indicates that said second data stream should be retrieved from said main memory.

25. The microprocessor based system, as recited in claim 24, wherein if said ignore-hit indicator indicates that said second data stream should be retrieved from said main memory, said instruction decoder provides an ignore hit signal to said cache memory.

26. The microprocessor based system, as recited in claim 25, wherein said control information comprises said ignore hit signal.

27. The microprocessor based system, as recited in claim 19, wherein said cache memory further comprises:

a data cache, for storing said first and second data streams, at different times; and a cache controller, for selectively retrieving said first and second data streams from said main memory.

28. The microprocessor based system, as recited in claim 27, wherein said cache controller retrieves said first and second data streams from said main memory responsive to said prefetch instruction being provided to said instruction register.

29. The microprocessor based system, as recited in claim 19, wherein said cache memory temporarily stores said first data stream, and subsequently said second data stream, for processing by said microprocessor.

30. The microprocessor based system, as recited in claim 19, wherein said prefetch instruction is provided to said instruction decoder by a control ROM.

31. The microprocessor based system, as recited in claim 19, wherein said prefetch instruction further comprises a hint field for specifying to said cache memory about how prefetched data streams are to be used by said microprocessor.

32. The microprocessor based system, as recited in claim 31, wherein said ignore-hit indicator is associated with said hint field.

33. The microprocessor based system, as recited in claim 31, wherein said ignore-hit indicator comprises a state within said hint field which may be asserted or not depending on whether a "hit" within said cache memory is to be ignored by said microprocessor.

34. A method for prefetching data from a main memory into a cache memory, within a computing system having a plurality of bus master devices, the bus master devices capable of modifying the data within the main memory, the method comprising the steps of:

providing a prefetch instruction to one of the bus master devices to prefetch the data from the main memory and to place the data into the cache memory;

specifying whether data within the cache memory is to be ignored during the prefetch;

if said step of specifying indicates that data within the cache memory is to be ignored, prefetching the data from the main memory, even if there is a cache "hit".

35. The method for prefetching data, as recited in claim 34, wherein one of the bus master devices is a microprocessor.

36. The method for prefetching data, as recited in claim 35, wherein the cache memory is within the microprocessor.

37. The method for prefetching data, as recited in claim 34, wherein the prefetch instruction is an instruction used by programmers to load data into the cache memory in anticipation of it being used by the computing system in subsequent instruction cycles.

38. The method for prefetching data, as recited in claim 34, wherein the prefetch instruction includes an ignore-hit indicator for specifying whether data within the cache memory is to be ignored during the prefetch.

39. The method for prefetching data, as recited in claim 38, wherein the ignore-hit indicator specifies that data within the cache memory is to be ignored if the ignore-hit indicator is set.

40. The method for prefetching data, as recited in claim 39, wherein if the ignore-hit indicator is cleared, data within the cache memory will not be ignored during the prefetch.

41. The method for prefetching data, as recited in claim 34, wherein if said step of specifying indicates that data within the cache memory is to be ignored, then treating a cache "hit" during the prefetch as either a "miss", or as a hit to invalid data.

42. The method for prefetching data, as recited in claim 34, wherein a cache "hit" indicates that the requested data is stored in the cache memory, and that the data is valid.

43. A micro controller, within a multiple bus master system having a main memory and a direct-memory-access (DMA) controller, the micro controller having an on-chip cache memory, the micro controller comprising:

an instruction decoder, for decoding instructions; and a prefetch instruction, provided to said instruction decoder by a source thereof, said prefetch instruction for loading specified data from the main memory into said cache memory, said prefetch instruction further comprising an ignore-hit indicator, said ignore-hit indicator for specifying that a cache "hit" should be ignored during execution of said prefetch instruction.

* * * * *